May 28, 1968   I-MING FENG   3,385,780
POROUS DUAL STRUCTURE ELECTRODE
Filed July 10, 1964
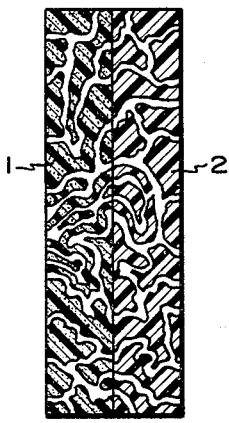
I-MING FENG   INVENTOR
BY Henry Berk
PATENT ATTORNEY 3,385,780
POROUS DUAL STRUCTURE ELECTRODE
I-Ming Feng, Kenilworth, N.J., assignor to Esso Research and Engineering Company, a corporation of Delaware
Filed July 10, 1964, Ser. No. 381,859
1 Claim. (Cl. 204—294)

ABSTRACT OF THE DISCLOSURE

A thin porous electrode consists of a thin layer of polytetrafluoroethylene pressed against a thin layer of polytetrafluoroethylene containing finely divided platinized carbon, the platinum being present in minimal amounts of 1.2 to 0.1 mg./cm.$^2$ in the electrically conductive face of the thin electrode.

---

This invention relates to an electrode for use in electrolytic devices. More particularly, this invention relates to a novel electrode composition and the electrode made thereby. Still more particularly, the invention relates to a dual-structure electrode made from an electrically conductive hydrophobic portion in conjunction with a second hydrophobic portion.

Heretofore in the art, electrodes have been made from either electrically conductive materials or electrically conductive materials coated with a substance which resisted wetting by the electrolyte.

It has now been found that highly efficient electrodes for use in systems in conjunction with liquid electrolytes can be made by utilizing a dual-structure electrode comprising two portions such that the portion forming the face which contacts the liquid electrolyte is electrically conductive and the opposite face which will be incontact with reactant will resist wetting.

The electrodes of the instant invention are made by intimately mixing a finely divided electrically conductive substance with a finely divided hydrophobic polymer and a removable filler material. The mixture is placed in a press and a mixture of the hydrophobic and a removable filler material is placed on top of the three-component mixture. The two mixtures are then pressed into a single unit. The pressed unit is then slowly heated from ambient temperatures up to about the decomposition temperature of the filler material in order to decompose the filler material or the filler is leached out with a solvent.

The heat decomposable filler materials that can be used in making the electrodes of this invention include ammonium oxalate, ammonium carbonate and finely divided polyethylene or polypropylene. The fillers that can be leached out include silica gel and alumina which are removed with a strong base and calcium carbonate which is removed with an acid.

The hydrophobic polymers which may be used in making the electrodes of this invention include polymers of tetrafluoroethylene, dichlorodifluoroethylene, ethylene-propylene, ethylene-butylene and the halogenated copolymers of ethylene-propylene, ethylene-butylene, propylene-butylene an disopropyl butylene. Asbestos, which has been waterproofed by treatment with a chlorosilane, can be used in place of the polymer as the hydrophobic agent.

The electrically conductive material used in making the instant electrodes would include finely divided carbon and metals, either noble metals or the transistion base metals which are not attacked by the electrolyte. The preferred electrically conductive material is finely divided carbon.

The electrodes made in accordance with the instant invention can be used as either the anode or cathode in a fuel cell, the anode or cathode in an electrically driven cell for the production of chemicals or in electrochemical oxidation and reduction processes. The electrodes of the instant invention can be impregnated with catalysts, either during their manufacture of subsequent to formation, by (1) using catalyzed conductive material, (2) mixing the electrically conductive component with catalytic material, (3) selecting an electrically conductive material which is catalytic, or (4) forming the electrode and then depositing the catalytic material upon the face of the electrode and/or within the pores which were formed by the removal of the filler material. Any of the known catalysts which would be suitable for the intended use can be used in conjunction with the instant electrode. The selection of the catalyst would be discretionary on the part of the operator and well within the skill of the routineer in the art. This invention does not include any particular catalyst.

Referring now to the drawing, there is shown a dual-structure electrode made in accordance with this invention. The electrode structure comprises a porous body having one portion, 1, consisting of an intimate mixture of finely divided carbon and polytetrafluoroethylene and a second portion, 2, consisting of polytetrafluoroethylene.

The electrodes produced in accordance with the instant invention are subjected to a pressure between about 1000 and 30,000 p.s.i. Preferably, the dual-structures are pressed into shape at a pressure between 5,000 and 12,000 p.s.i.

The electrodes made in accordance with the instant invention are superior to the prior art electrodes in that the instant electrodes can be made about one-half the thickness of the prior art electrodes and utilizing about one-quarter or less of the amount of catalyst as the prior art electrodes. The electrodes made by the instant invention are also superior to the prior art electrodes in that they can withstand a much higher hydropstatic head without failure as a result of flooding by the liquid electrolyte.

The following examples are submitted for the purpose of illustration only and are not deemed to be a limitation upon the scope of the invention as set forth in the appended claims.

Example 1

An electrode was made in accordance with the instant invention and tested as the electrode in a fuel cell. The electrode was prepared by intimately mixing finely divided carbon, polytetrafluoroethylene and ammonium oxalate in a weight ratio of 2:1:1. The carbon was catalyzed with platinum. This mixture was placed in a press, and a mixture of polytetrafluoroethylene and ammonium oxalate in a 2:3 weight ratio was placed on top of the three-component mixture. The mixture was pressed at 10,000 p.s.i. The structure was removed from the press and used as the cathode in a driven fuel cell utilizing 30 wt. percent sulfuric acid as an electrolyte and air as the oxidant. The cell temperature was maintained at about 82° C. The electrode operated efficiently showing not more than 0.54 volt polarization at 100 amps per square foot of current density.

Example 2

Five electrodes were made in accordance with the procedure of Example 1 but the amount of catalyst utilized was varied from 1.2 mg./cm.$^2$ to 0.1 mg./cm.$^2$. The electrodes were tested for efficiency in a fuel cell utilizing air as the oxidant, 30 wt. percent sulfuric acid as the electrolyte and a driven anode. The tests indicated that the amount of catalyst utilized in the electrodes made in accordance with the instant invention is significantly less than that needed in the known electrodes. In this regard, it is to be noted that the prior art electrodes utilized about 12 mg./cm.$^2$ of catalyst. The results of the tests are set forth in Table I below.

TABLE I

| Electrode Description | Platinum Loading, mg./cm.$^2$ | Pounds Pressure | Polarization from the Theoretical O$_2$ at Indicated ma./cm.$^2$ | | |
|---|---|---|---|---|---|
| | | | 1 | 10 | 100 |
| 1. 2:1:1 C(Pt)-T-AO 2:3 T-AO | 1.2 | 10,000 | 0.32 | 0.40 | 0.54 |
| 2. 2:1:1 C(Pt)-T-AO 2:3 T-AO | 1.0 | 8,000 | 0.30 | 0.39 | 0.57 |
| 3. 2:1:1 C(Pt)-T-AO 1:2 T-AO | 0.5 | 8,000 | 0.32 | 0.41 | 0.61 |
| 4. 2:1:1 C(Pt)-T-AO 2:3 T-AO | 0.2 | 8,000 | 0.43 | 0.54 | 0.77 |
| 5. 2:2:3 C(Pt)-T-AO 1:2 T-AO | 0.1 | 8,000 | 0.39 | 0.53 | 0.89 |

T—tetrafluoroethylene polymer.
C(Pt)—carbon catalyzed with platinum.
AO—ammonium oxalate.

*Example 3*

Several electrodes were made in accordance with the procedure of Example 1 and tested to show the increase in efficiency brought about by the reduced size of the electrodes made in accordance with the instant invention. Electrode A is a single unit electrode made by intimately mixing finely divided catalyzed carbon with polytetrafluoroethylene and ammonium oxalate, pressing the structure to the desired shape at about 8,000 p.s.i. and then slowly heating the pressed structure in order to decompose the ammonium oxalate thereby producing a porous body comprising essentially an intimate mixture of catalyzed carbon and the polymer. Electrodes B and C were made in accordance with the procedure set forth in Example 1, the difference between electrodes B and C being the thickness of the catalyzed portion of the electrode. The three electrodes, A, B and C, were tested as the cathode in a fuel cell utilizing air as the oxidant and 30 wt. percent sulfuric acid as the electrolyte. The results of that test are set forth in Table II.

TABLE II
[Test Conditions: 82°C. Air as oxidant]

| Electrode | Electrode Description | Thickness Before Compression, in. | Polarization from Theoretical O$_2$ at the Indicated ma./cm.$^2$ | | | | |
|---|---|---|---|---|---|---|---|
| | | | 0 | 0.8 | 80 | 120 | 160 |
| A | 2:1:1 C(Pt)-T-AO | 1/8 | 0.25 | 0.26 | 0.52 | 0.60 | 0.67 |
| B | 2:1:1 C(Pt)-T-AO 1:1 T-AO | 1/16 1/16 | 0.23 | 0.25 | 0.50 | 0.56 | 0.63 |
| C | 2:1:1 C(Pt)-T-AO 1:1 T-AO | 1/32 1/32 | 0.25 | 0.31 | 0.52 | 0.56 | 0.60 |

C(Pt)—carbon catalyzed with platinum.
T—tetrafluoroethylene polymer.
AO—ammonium oxalate.

The test results set forth supra indicate that the electrodes made by the instant invention are substantially better, even though utilizing one-quarter the electrode volume and hence one-quarter the amount of catalyzed carbon.

*Example 4*

An electrode was made in order to test the effect of a hydrostatic head upon the electrodes made by this invention. It was prepared by mixing finely divided platinized carbon, polytetrafluoroethylene and ammonium axalate in a 2:1:1 ratio, placing the three-component mixture in a press and adding a 1:1 ratio of polytetrafluoroethylene and ammonium oxalate thereon and then pressing the two mixtures at about 10,000 p.s.i. The resulting structure was then heated slowly to the decomposition temperature of ammonium oxalate and maintained at such decomposition temperature until the ammonium oxalate had decomposed. The electrode was then tested in order to determine the effect of a hydrostatic head thereon. It was tested as the cathode in a fuel cell utilizing air as the oxidant and 30 wt. percent sulfuric acid as the electrolyte at a cell temperature of about 82° C. The hydrostatic head upon the electrode in Test A was 0.5 inch. The hydrostatic head upon the electrode in Test B was 5.0 inches. The results of the tests set forth in Table III below show that the tenfold increase in hydrostatic head had no effect upon the efficient operation of the electrode.

TABLE III
[Test Conditions: 82° C. Air as oxidant]

| Test | Hydrostatic Head, in. | Polarization from Theoretical O$_2$ at the Indicated ma./cm.$^2$ | | | | |
|---|---|---|---|---|---|---|
| | | 0 | 0.8 | 80 | 120 | 160 |
| A | 0.5 | 0.25 | 0.31 | 0.52 | 0.56 | 0.60 |
| B | 5.0 | 0.26 | 0.31 | 0.52 | 0.56 | 0.60 |

What is claimed is:
1. A porous dual structure electrode of two layers pressed together consisting essentially of polytetrafluoroethylene as one layer and a mixture of polytetrafluoroethylene with finely divided platinized carbon as the other layer that forms an electrically conductive face;
said platinized carbon being in a ratio of 2 parts by weight per 1 to 2 parts by weight of the polytetrafluoroethylene in each of the two layers;
each of said layers pressed together having a thickness less than 1/16 inch; and
1.2 to 0.1 milligrams of platinum of the platinized carbon being present per square centimeter of the electrically conductive face.

References Cited

UNITED STATES PATENTS

| | | | |
|---|---|---|---|
| 2,358,419 | 9/1944 | Schumacher et al. | 204—290 |
| 2,782,180 | 2/1957 | Weidman | 260—41 |
| 3,116,170 | 12/1963 | Williams et al. | 136—86 |
| 3,201,282 | 8/1965 | Justi et al. | 136—86 |
| 3,238,068 | 3/1966 | Hipp | 136—120 |
| 3,276,909 | 10/1966 | Moos | 136—86 |
| 3,281,511 | 10/1966 | Goldsmith | 136—86 X |
| 3,297,482 | 1/1967 | Zimmer | 136—86 |
| 3,297,484 | 1/1967 | Niedrach | 136—86 |

HOWARD S. WILLIAMS, *Primary Examiner.*

JOHN H. MACK, *Examiner.*

D. R. JORDAN, *Assistant Examiner.*